United States Patent [19]

Yoshida

[11] Patent Number: 4,544,894

[45] Date of Patent: Oct. 1, 1985

[54] DC VOLTAGE CONTROL CIRCUITS

[75] Inventor: Yasuharu Yoshida, Tokyo, Japan

[73] Assignee: NEC Corporation, Tokyo, Japan

[21] Appl. No.: 591,752

[22] Filed: Mar. 21, 1984

[30] Foreign Application Priority Data

Mar. 23, 1983 [JP] Japan .................................. 58-48249
Mar. 23, 1983 [JP] Japan .................................. 58-48250

[51] Int. Cl.$^4$ ............................................. H03D 3/00
[52] U.S. Cl. .................................... 329/122; 329/124; 329/133; 329/167; 329/168
[58] Field of Search ................... 329/50, 112, 122, 124, 329/126, 131, 132, 133, 134, 135, 146, 167, 168, 169; 455/309, 312, 337

[56] References Cited

U.S. PATENT DOCUMENTS

4,071,829  1/1978  Davis et al. .......................... 329/122

*Primary Examiner*—Eugene R. LaRoche
*Assistant Examiner*—James C. Lee
*Attorney, Agent, or Firm*—Sughrue, Mion, Zinn, Macpeak and Seas

[57] ABSTRACT

A DC voltage control circuit comprising DC superposing means for superposing a control signal an input signal; discriminating means for discriminating an output of the superposing means with a plurality of discriminating levels including a center level and for providing a regenerated output digital signal and an error digital signal; control signal generating means for providing control signal in response to the error digital signal; and limiter means for limiting the output of said discriminating means to be within a predetermined range which is less than a spacing between said discriminating level and the center level.

10 Claims, 9 Drawing Figures

DC VOLTAGE CONTROL CIRCUITS

BACKGROUND OF THE INVENTION

This invention relates to a DC voltage control circuit, and more particularly a DC voltage control circuit utilized in a demodulation apparatus as a circuit for discriminating a demodulated signal produced by phase detecting a quadrature amplitude modulated wave, and for compensating for the DC drift or the like of the demodulated signal.

In recent years, a multi-level quadrature amplitude modulation (QAM) system for carrying a digital signal with a microwave carrier wave has been developed as a high efficiency modulation system capable of efficiently utilizing a frequency band. In order to realize such a high efficiency modulation system, it is necessary to avoid, as far as possible, undesirable phenomenon occurring at various parts of the circuit, a typical one of such phenomena being a DC drift contained in the input to the discriminating circuit of the demodulation apparatus.

In a DC voltage control circuit for compensating for the DC drift component, a DC superposing circuit such as a subtractor superposes a DC voltage upon the demodulated multi-level signal. A discriminating circuit such as an A/D (analog-to-digital) converter discriminates the output of the superposing circuit with respect to a plurality of discriminating levels and provides a plurality of digital signals. The control signal generator filters one of the digital signals and produces the DC voltage. This circuit operates satisfactory when used continuously. But, as will be described later, when the input signal is once interrupted and then recovered, there is a fear that an abnormal pull-in occurs depending upon the initial state. Therefore, the circuit provides erroneous DC voltage, thereby failing to resume a normal operation.

SUMMARY OF THE INVENTION

An object of this invention is to provide an improved DC voltage control circuit capable of avoiding an abnormal pull-in phenomenon in any initial state.

According to this invention, there is provided a DC voltage control circuit comprising DC superposing means for superposing a control signal upon an input signal; discriminating means for discriminating an output of the superposing means with a plurality of discriminating levels including a center level and providing a regenerated output digital signal and an error digital signal; control signal generating means for providing the control signal in response to the error digital signal, and limiter means limiting the output of the discriminating means to be within a predetermined range which is less than a spacing between the discriminating level and the center level.

According to a modified embodiment of this invention, there is provided a DC voltage control circuit comprising DC superposing means for superposing a control signal on an input signal; discriminating means for discriminating an output of said superposing means with a plurality of signal discriminating levels including a center discriminating level and with a plurality of error discriminating levels and for providing a plurality of digital signals, said signal discriminating levels dividing said input signal into a plurality of signal regions, said error discriminating levels dividing said signal regions into two, respectively; and control signal generator means for generating said control signal in response to some of said digital signals, which comprise error information obtained from said error regions except at least the error regions on positive or negative side adjoining said center discriminating level.

DESCRIPTION OF THE PREFERRED EMBODIMENTS

To have better understanding of this invention, the demodulator apparatus will firstly be described with reference to FIG. 1. This demodulation apparatus is adapted for 16 QAM waves and comprises an intermediate frequency amplifier 1 having an automatic gain control performance, a demodulation circuit 300 for demodulating a 16-level QAM wave outputted from the amplifier 1 to provide two series of 4-level digital signals P and Q, and a DC voltage control circuit 200. This circuit 200 includes subtractors 3 and 3a for superposing DC voltages on respective outpus P and Q, discrimination circuits A/D converters 4 and 4a for discriminating the outputs 102 of the substractors 3 and 3a in terms of 8 levels to produce 2-bit regenerated output signals $X_1$ or $X_2$, and $Y_1$ or $Y_2$ and an one-bit error signal $X_3$ or $Y_3$, and low-pass filters 5 and 5a which repectively suppress high frequency noise components contained in the error signals $X_3$ and $Y_3$, for producing a control DC voltage 101 fed back to subtractors 3 and 3a.

The demodulation circuit 300 comprisies a carrier synchronizing circuit 19 responsive to the output data signals of the DC voltage control circuit 200 to produce a reference carrier frequency, and a demodulator 2 including a phase detector 24 and another phase detector 24a which respectively respond to the reference carrier frequency directly and via a 90 degree phase shifter 25 so as to demodulate a 16 QAM wave applied to the phase detectors 24 and 24a.

The carrier synchronizing circuit 19 comprises a section including an exclusive OR gate 23a with its inputs connected via terminals $C_1$ and $C_2$ to a data signal $Y_3$ from the A/D converter 4a and a data signal $X_1$ from the A/D converter 4, an exclusive OR gate 23 with its inputs connected via terminals $C_3$ and $C_4$ to a data signal $X_3$ from the A/D converter 4 and a data signal $Y_1$ from the A/D converter 4a, and a subtractor 22 applied with outputs of the exclusive OR gates 23 and 23a. This section is responsive to the outputs of the A/D converters 4 and 4a to generate an error signal for detecting the rotational direction of the respective waveform response signals of the 16 QAM wave. In addition to this error signal generating section, the carrier synchronizing circuit 19 has a low-pass filter 21 responsive to the output of the subtractor 22, and a voltage controlled oscillator 20 controlled by the output of the low-pass filter to produce the reference carrier frequency supplied to the phase detector 24 and 90 degree phase shifter 25 via a terminal $C_5$.

The carrier synchronizing circuit 19 operates as follows. Data signals $Y_1$ and $X_3$ are exclusive ORed at the exclusive OR gate 23 so that this gate 23 produces an output "0" when the respective waveform response signals of the 16 QAM wave rotate counterclockwise. Data signals $X_1$ and $Y_3$ are exclusive ORed at the exclusive OR gate 23a which, in turn, produces an output "1" when the respective waveform response signals rotate counterclockwise. Thus, by subtracting the output signals of the two exclusive OR gates 23 and 23a at the subtractor 22, a "0" signal of doubled level can be obtained. This doubled "0" level output is passed through the low-pass filter 21 for suppression of noises and supplied to the voltage controlled oscillator 20 which then produces a carrier signal in synchronism with the input 16 QAM wave.

In this demodulation apparatus, the DC voltage control circuit comprised of subtractors 3 and 3a, A/D converters 4 and 4a and low-pass filters 5 and 5a controls the DC component contained in the demodulated signals such that the A/D converters can discriminate the signal at an optimum operating condition.

Figure 1:
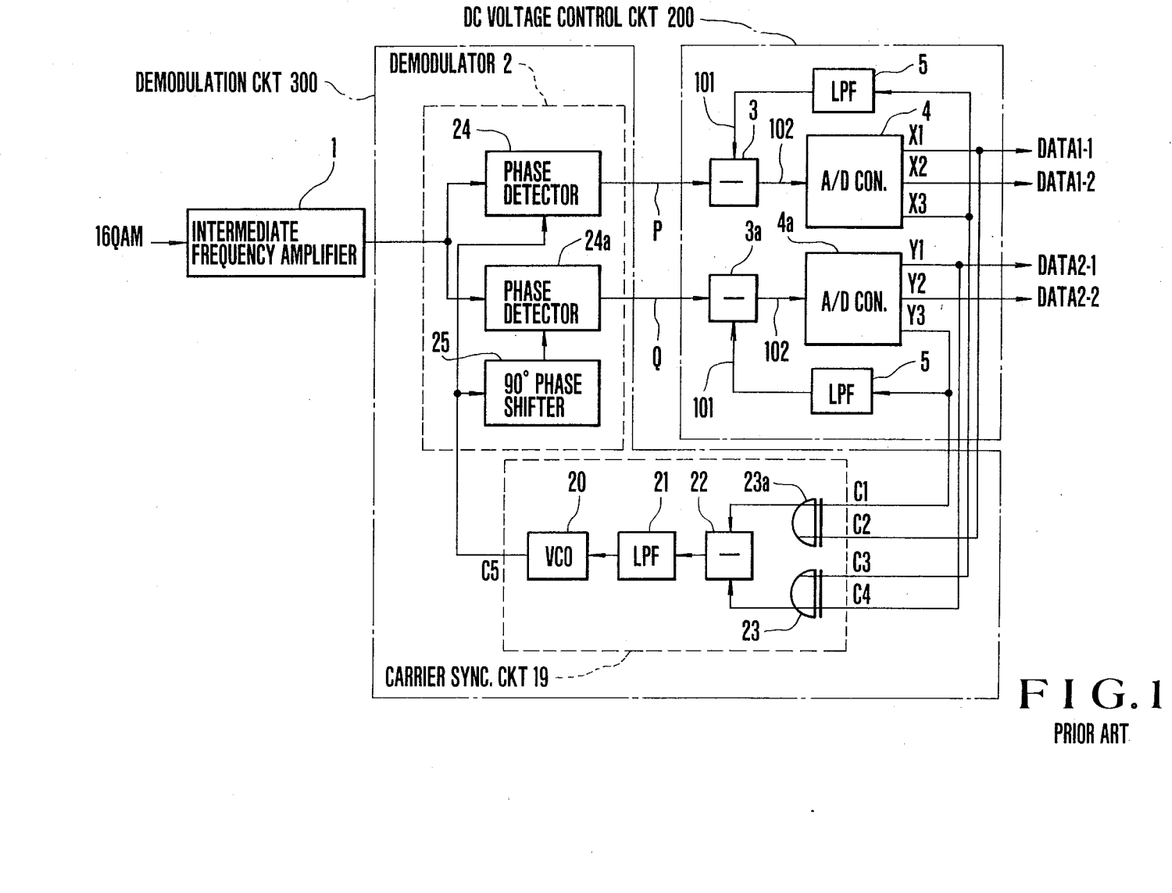
FIG. 1 is a block diagram showing a prior art demodulation apparatus.
Figure 2:
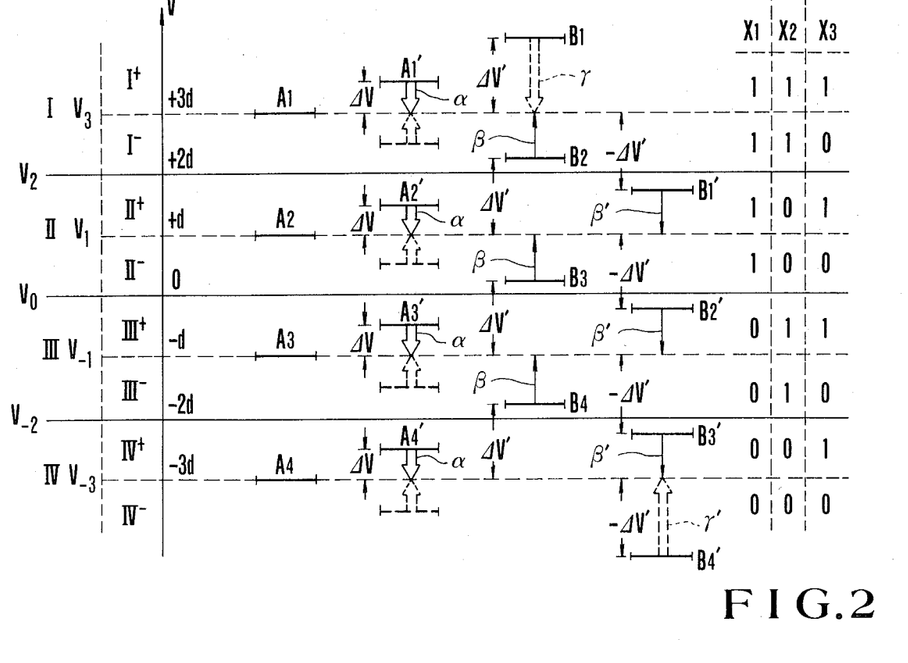
FIG. 2 shows discrimination regions of an A/D converter.

FIG. 2 is a chart showing the discrimination regions of each A/D converter useful to explain the operation of the DC voltage control circuit. More particularly, the input voltage to each A/D converter 4 or 4a is divided into four signal regions I to IV in accordance with three signal discriminating levels $V_0 = 0$ volt, $V_2 = +2d$ volt, and $V_{-2} = -2d$ volt, and then respective signal regions are divided into two error regions I+ and I−, II+ and II−, III+ and III−, and IV+ and IV− in accordance with error discriminating levels $V_1 = +d$ volt, $V_{-1} = -d$ volt, $V_3 = +3d$ volt and $V_{-3} = -3d$ volt. Each A/D converter 4 or 4a is constructed to send out binary signals $X_1$, $X_2$ and $X_3$ shown in FIG. 2 or $Y_1$, $Y_2$ and $Y_3$ (not shown) depending upon whether the input signal 102 is contained in which one of the regions shown in FIG. 2. Since either A/D converter 4 or 4a operates in the same manner, only one channel (P signal channel) including the A/D converter 4 will be described hereafter. When the A/D converter 4 shown in FIG. 1 is in the optimum operating state, the four signal levels of the input signal 102 coincide with centers of respective signal regions, that is, error discriminating levels $A_1$ to $A_4$. When the input signal level deviates from these values in the positive direction by $\Delta v$ to become $A_1$, to $A_4'$ due to a DC drift, the error signals $X_3$ become all "1" with respect to any signal levels, thereby increasing the DC output 101 of the low-pass filter 5. Consequently the DC component in the output 102 of the subtractor 3 whose input P has been superposed with a DC voltage will change in the negative direction so that $A_1'$ to $A_4'$ are shifted in a direction of arrow $\alpha$ to return to the optimum operating state. Conversely, when the input signal level shifts in the negative direction as shown by dotted lines due to the DC drift, the error signals $X_3$ become all "0" to decrease the DC output of the control signal generator 5 so that the DC components contained in the output signal 102 of the substractor 3 will be controlled in the positive direction. Thus, even when the DC component of the input signal D inputted to the subtractor is caused to vary due to the DC drift caused by the demodulator and a baseband amplifier, the input signal 102 to the A/D converter will always be controlled to the optimum operating states $A_1$ to $A_4$.

With this prior art DC voltage control circuit, however, when the input signal is once interrupted and then applied again, the DC component deviation $\Delta V'$ at the initial state is large so that $\Delta V'$ becomes larger than the discriminating level spacing d as shown by $B_1$ to $B_4$ in FIG. 2. Then, the arrow signal $X_3$ regarding $B_1$ become "1" but error signals $X_3$ regarding $B_2$ to $B_4$ become all "0", thus increasing outputs "0". Consequently, the DC componet of the output 102 of subtractor 3 will be controlled in the negative direction. Consequently, except for $B_2$ subject to control in the normal direction as shown by arrow $\gamma$, $B_2$ to $B_4$ will be shifted in direction $\beta$ opposite to the normal control direction, thus resulting in abnormal pull-in phenomenon wherein $B_2$ shifts to $A_1$, $B_3$ to $A_2$, and $B_4$ to $A_3$. On the other hand, when the DC component deviation change, greatly in the negative direction beyond $-d$ to assume $B_1'$ to $B_4'$, the number of "1" outputs of the error signals $X_3$ increases, whereby except for $B_1'$ subject to control in the normal direction as shown by arrow $\gamma$, $B_1'$ to $B_4'$ are controlled in direction $\beta'$ opposite to the normal direction to cause abnormal pull-in phenomenon. Consequently, the input signal will never be correctly regenerated, thus causing errors.

A first method effective to prevent the abnormal pull-in phenomenon involves the step of not using error information from error regions I−, II+, II−, III+, III− and IV+ that might generate control information in erroneous directions shown by arrows $\beta$ and $\beta'$ in FIG. 2 and causing the control signals based on only the outputs from error regions I+ and IV− that output control information in correct directions shown by $\gamma$; and $\gamma'$ in FIG. 2.

Figure 3:
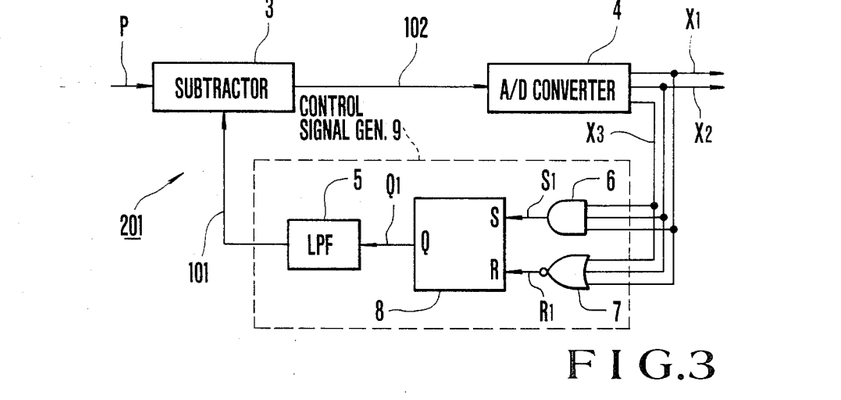
FIG. 3 is a block diagram showing a first embodiment of a DC voltage control circuit according to this invention.

FIG. 3 is a block diagram showing a first embodiment of a DC voltage control circuit, generally designated by 201, according to this invention based on this method. Similar to FIG. 1, either signal channel of this embodiment (exemplified as P signal channel herein) is constituted by a subtractor 3, an A/D convertor 4 and a control signal generator 9. The control signal generator 9 comprises an AND gate circuit 6 that determines a logic product of the outputs $X_1$, $X_2$ and $X_3$ of the A/D converter 4, a NOR gate circuit 7 that determines a NOR logic sum of the outputs $X_1$, $X_2$ and $X_3$, a flip-flop circuit 8 with its set input terminal connected to receive the output signal $S_1$ of the AND gate circuit 6 and its reset terminal connected to receive the output signal $R_1$ of the NOR gate circuit 7, and a low-pass filter 5 having the same construction as that shown in FIG. 1. The following Table I shows how the output signals $S_1$ and $R_1$ of the AND gate circuit 6 and the NOR gate circut 7 are related to various error regions shown in FIG. 2.

TABLE

| | I+ | I− | II+ | II− | III+ | III− | IV+ | IV− |
|---|---|---|---|---|---|---|---|---|
| $S_1$ | 1 | 0 | 0 | 0 | 0 | 0 | 0 | 0 |
| $R_1$ | 0 | 0 | 0 | 0 | 0 | 0 | 0 | 1 |

By using the output $S_1 =$ "1" from region I+ and the output $R_1 =$ "1" from region IV−, the flip-flop circuit 8 is caused to produce a binary signal $R_1$ of "1" and "0" and the signal $R_1$ is processed by the low-pass filter 5 in the same manner as has been described in connection with FIG. 1 for producing a DC output 103. With the construction shown in FIG. 3, even in the case of $B_1$ to $B_4$ and $B_1'$ to $B_4'$ shown in FIG. 2, correct controls shown by $\gamma$ and $\gamma'$ can be ensured, thus eliminating abnormal pull-in operation.

Figure 4:
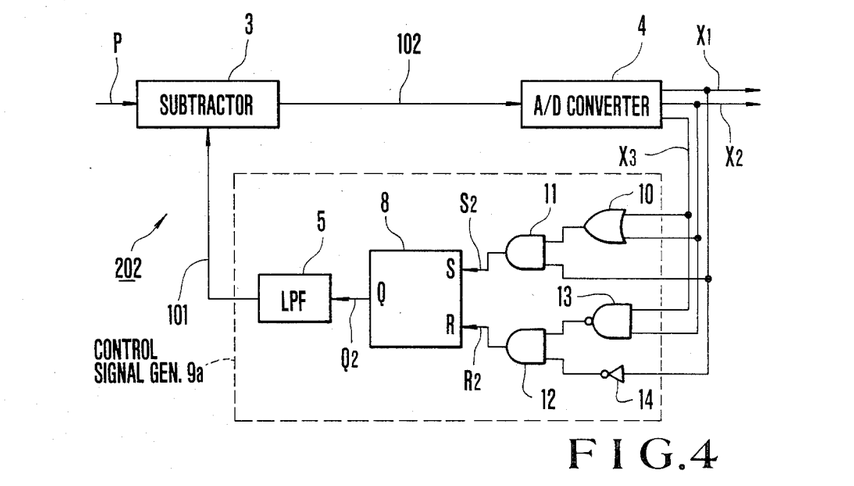
FIG. 4 is a block diagram showing a second embodiment of the DC voltage control circuit according to this invention.

FIG. 4 is a block diagram showing a second embodiment of DC voltage control circuit 202 according to this invention which is constituted by a subtractor 3, an A/D converter 4 and a control signal generator 9a. In this embodiment, the control signal generator 9a is constituted by an OR gate circuit 10, AND gate circuits 11 and 12, a NAND gate circuts 13, a NOT circuit 14, a flip-flop circuit 8, and a low-pass filter 5. The circuit of this second embodiment is constructed so as not to use the error information from the error regions II− and III+ among various error regions shown in FIG. 2 but to produce a control signal in accordance with only the error information from remaining six error regions. The set input $S_2$ and the reset input $R_2$ of the flip-flop circuit 8 are related to various error regions as shown in the following Table II.

TABLE II

| | I+ | I− | II+ | II− | III+ | III− | IV+ | IV− |
|---|---|---|---|---|---|---|---|---|
| $S_2$ | 1 | 1 | 1 | 0 | 0 | 0 | 0 | 0 |
| $R_2$ | 0 | 0 | 0 | 0 | 0 | 1 | 1 | 1 |

Thus, the control signal is generated by using the output $S_2$ of "1" and the output $R_2$ of "1". Since, even when the input signal 102 to the A/D converter 4 shifts to $A_1'$ to $A_4'$ or $B_1$ to $B_4$ from the optimum state, the probability of generating the four signal levels is equal and since their order of generation can be considered random, the ratio of probabilities at which $S_2$ becomes "1" and $R_2$ becomes "1" becomes 2:1. For this reason, the interval in which the ouptput $Q_2$ of the flip-flop circuit 8 becomes "1" will become longer than the interval in which the output $Q_2$ becomes "0" so that the input signal 102 will be controlled in the directions $\alpha$ and $\gamma$. Conversely, when the input signal 102 shifts to $B_1'$ to $B_4'$, the input signal will be controlled in the normal direction shown by arrow $\gamma'$, thus always converging to the optimum state without causing any abnormal pull-in phenomenon.

Figure 5:
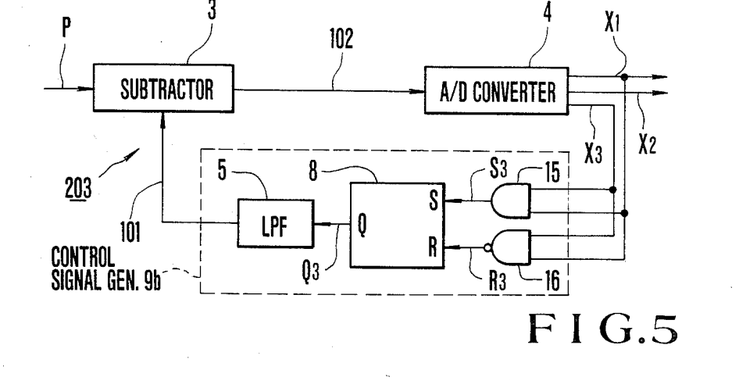
FIG. 5 is a block diagram showing a third embodiment of the DC voltage control circuit according to this invention.

FIG. 5 is a block diagram showing a third embodiment of DC voltage control circuit 203 according to this invention. The circuit 203 comprises a subtractor 3, an A/D converter 4 and a control signal generator 9b. The control signal generator 9b is constituted by an AND gate circuit 15, a NAND gate circut 16, a flip-flop circuit 8 and a low-pass filter 5. In this embodiment, a control signal is generated by using error information from the error regions I+, II+, III− and IV−. The set input $S_3$ and the reset input $R_3$ of the flip-flop circuit 8 are related to various error regions as shown in the following Table III.

TABLE III

| | I+ | I− | II+ | II− | III+ | III− | IV+ | IV− |
|---|---|---|---|---|---|---|---|---|
| $S_3$ | 1 | 0 | 1 | 0 | 0 | 0 | 0 | 0 |
| $R_3$ | 0 | 0 | 0 | 0 | 0 | 1 | 0 | 1 |

Thus, the control signal is provided by using outputs $S_3$ of "1" from regions I+ and II+, and outputs $R_3$ of "1" from regions III− and IV−. In this circuit, when the input signal 102 are $B_1$ to $B_4$ and $b_1'$ and $B_4'$ shown in FIG. 3 the probability in which $S_3$ is "1" becomes equal to that in which $R_3$ is "1" so that a valid control signal can not be produced. In other cases, control signals approaching toward the optimum operation state can be produced so that the control signal can be converged on the optimum operation state free from abnormal pull-in phenomenon although time for the convergence is prolonged slightly.

Figure 6:
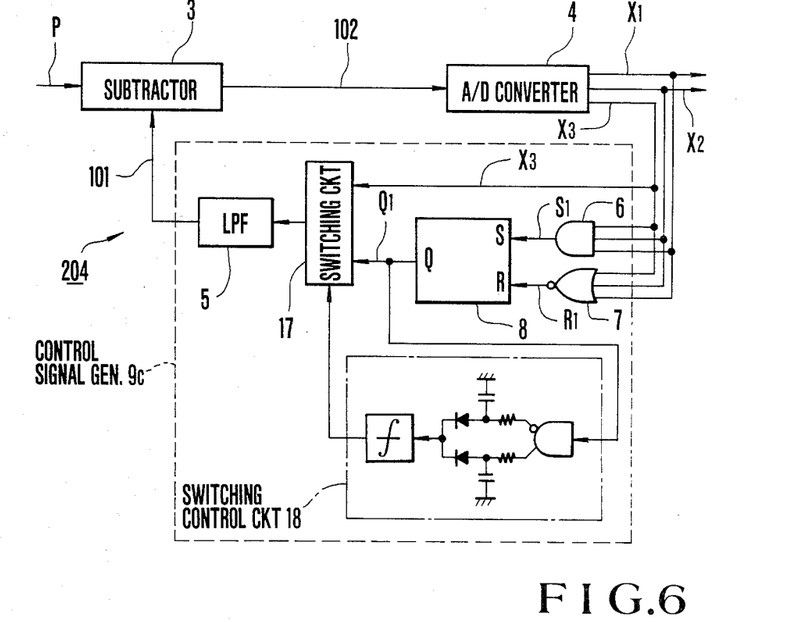
FIG. 6 is a block diagram showing a fourth embodiment of the DC voltage control circuit according to this invention.

FIG. 6 is a block diagram showing a fourth embodiment of DC voltage control circuit 204 according to this invention. The circuit 204 comprises a subtractor 3, an A/D converter 4 and a control signal generator 9c. The control signal generator 9C is provided with a switching circuit 17 which feeds to a low-pass filter 5 an error signal $X_3$ (same as that of the prior art shown in FIG. 1) or the flip-flop output Ql (identical to that of the third embodiment shown in FIG. 3). A switching control circuit 18 compares a positive output $Q_1$ and an inverted output $Q_1$. When $Q_1$ is in sequence of "1" or "0", the switching circuit 17 selects $Q_1$ as the input whereas when $Q_1$ alternately becomes "1" and "0", the transfer circuit 17 select signal $X_3$ as the input to the low-pass filter 5. Accordingly, when the input signal 102 greatly deviates from the optimum level, the circuit operates in the same manner as in FIG. 3, thus controlling the control signal substantially near the optimum level. Thereafter, a highly precise control is performed by utilizing error information from all error regions in the same manner as in FIG. 1 utilizing $X_3$.

Although the embodiments shown in FIGS. 3 and 4 are constructed to form set and reset inputs to the flip-flop circuit 8 by subjecting outputs $X_1$, $X_2$ and $X_3$ of the A/D converter 4 to logical processings, the set and reset inputs can be derived out directly from the outputs of respective discriminators comprising the A/D converter 4. Furthermore, the embodiments shown in FIGS. 3 to 5 are constructed to produce the control voltage 101 by converting "1" information to the set input terminal and "1" information to the reset input terminal into binary signals with the flip-flop circuit, it is also possible to make the set and reset inputs correspond to positive and negative voltages and then to integrate the positive and negative voltages to produce the control signal, without utilizing the flip-flop circuit.

The embodiment shown in FIG. 6 is constructed to use the circuit shown in FIG. 1 and the circuit shown in FIG. 3 by switching them but the circuit shown in FIG. 3 may be substituted by the circuit shown in FIG. 4 or 5. Further, it should be understood that the circuits shown in FIGS. 3 and 4 may be combined.

Although, in the foregoing embodiments, a case was described in which the input signal level is a four-level signal of $\pm d$ and $\pm 3d$, which have positive and negative symmetricity, the signal may not always be symmetrical in positive and negative directions, multilevel signals other than the four level signal can also be processed in the same manner. Although a subtractor was used for the purpose of superposing DC voltage upon the input signal, an adder can be used instead of the subtractor. In other words, any other circuit can be used so long as it can control the DC component with a control signal.

Figure 7:
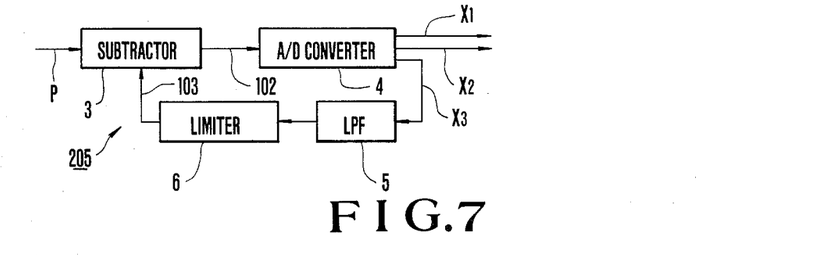
FIG. 7 is a block diagram showing a fifth embodiment of the DC voltage control circuit according to this invention.

In still another embodiment of DC voltage control circuit 205 according to this invention as shown in FIG. 7, there are provided a subtractor 3, an A/D converter 4 a low-pass filter 5 and a limiter 26 which limits the output voltage of the low-pass filter 5 so that the DC voltage 103 to be superposed on the input signal P by subtractor 3 is limited in a predetermined range of ±L less than ±d. Accordingly, even when the input P to subtractor 3 decreases to zero volt upon interruption of the input P, the input 102 to the A/D converter 4 becomes +L or −L. Where a predicted maximum drift including the DC component variation of a 4-value input signal is assumed to be +D, no initial condition that forms an abnormal pull-in phenomenon will occur if the level of L is selected to satisfy a relation d ≧ (D+L). The limiter 6 may have any well known construction and by limiting the output range thereof to satisfy the condition described above in which the output range is less than the discriminating level spacing d, a DC voltage control circuit freed from abnormal pull-in phenomenon can readily be obtained. Since, under the normal operation state, the DC drift component ±D must be compensated for by the DC voltage 103 to be superposed, the relation L≧D. Accordingly, D≦d/2 is of course required and the permissible range of the DC drift should be ½ of the discriminating level spacing d in both positive and negative directions. Accordingly, the discriminating level spacing of the A/D converter should be selected to satisfy the condition described above from a predictable drift level.

As described above, according to a DC voltage control circuit embodying the invention, it is possible to resume the normal operation irrespective of the initial condition without resulting in any abnormal pull-in phenomenon even when the input signal is interrupted. Thus preventing regeneration error caused by the abnormal pull-in phenomenon.

Practically, the DC voltage control circuit of the present invention described previously are preferably incorporated in demodulation apparatus for obtaining data signals from 4-PSK wave, or 64 QAM wave.

Figure 8:
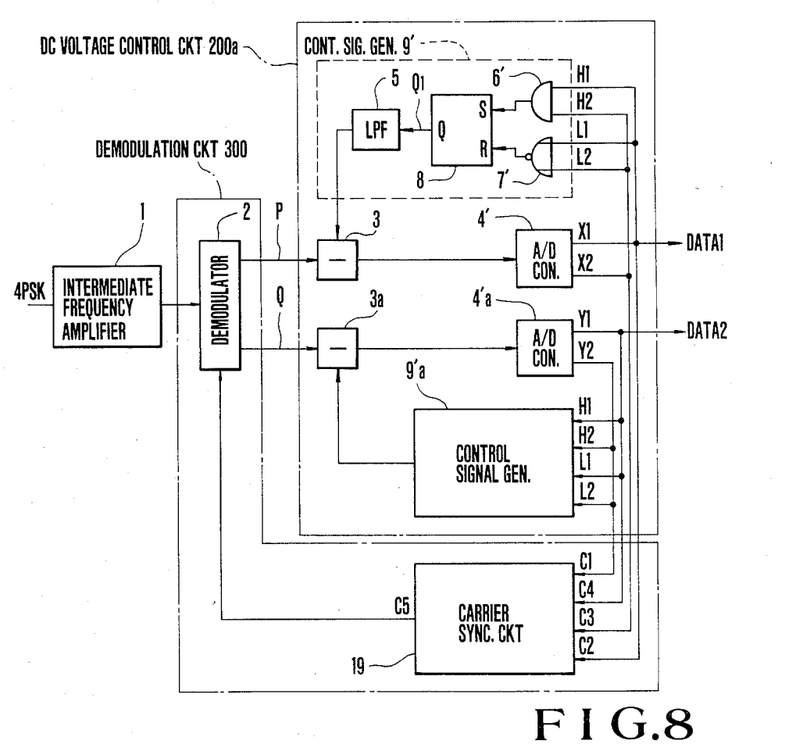
FIG. 8 is a block diagram showing a first embodiment of demodulation apparatus according to this invention which is adapted for demodulation of 4 PSK (4-phase phase shift keying) waves.

FIG. 8 shows an embodiment of demodulation apparatus of the invention adapted for demodulation of 4 PSK waves. A DC voltage control circuit 200a is constituted by control signal generators 9′ and 9a′ and A/D converters 4′ and 4a′ and subtractors 3 and 3a respectively associated the generators 9′ and 9a′. Each of the control signal generators 9′ and 9a′ has a similar construction to the generator 9 in FIG. 3 except that the number of inputs to an AND gate circuit 6′ and a NOR gate circuit 7′ is two. Thus, Data signals X₁ standing for data 1 and X₂ from the A/D converter 4′ are applied to AND gate circuit 6′ via terminals H₁ and H₂ and to the NOR gate circuit 7′ via terminals L₁ and L₂ in the control signal generator 9′. Data signals Y₁ standing for data 2 and Y₂ from the A/D converter 4a′ are applied to the control signal generator 9a′ having the same construction as the generator 9′. The same demodulation circuit 300 as that of FIG. 1 is used, whereby the carrier synchronizing circuit 19 of the demodulation circuit 300 is responsive to data signals X₁, X₂, Y₁ and Y₂ from the DC voltage control circuit 200a via terminals C₁ to C₄ to produce the reference carrier signal applied via terminal C₅ to the demodulator 2.

Figure 9:
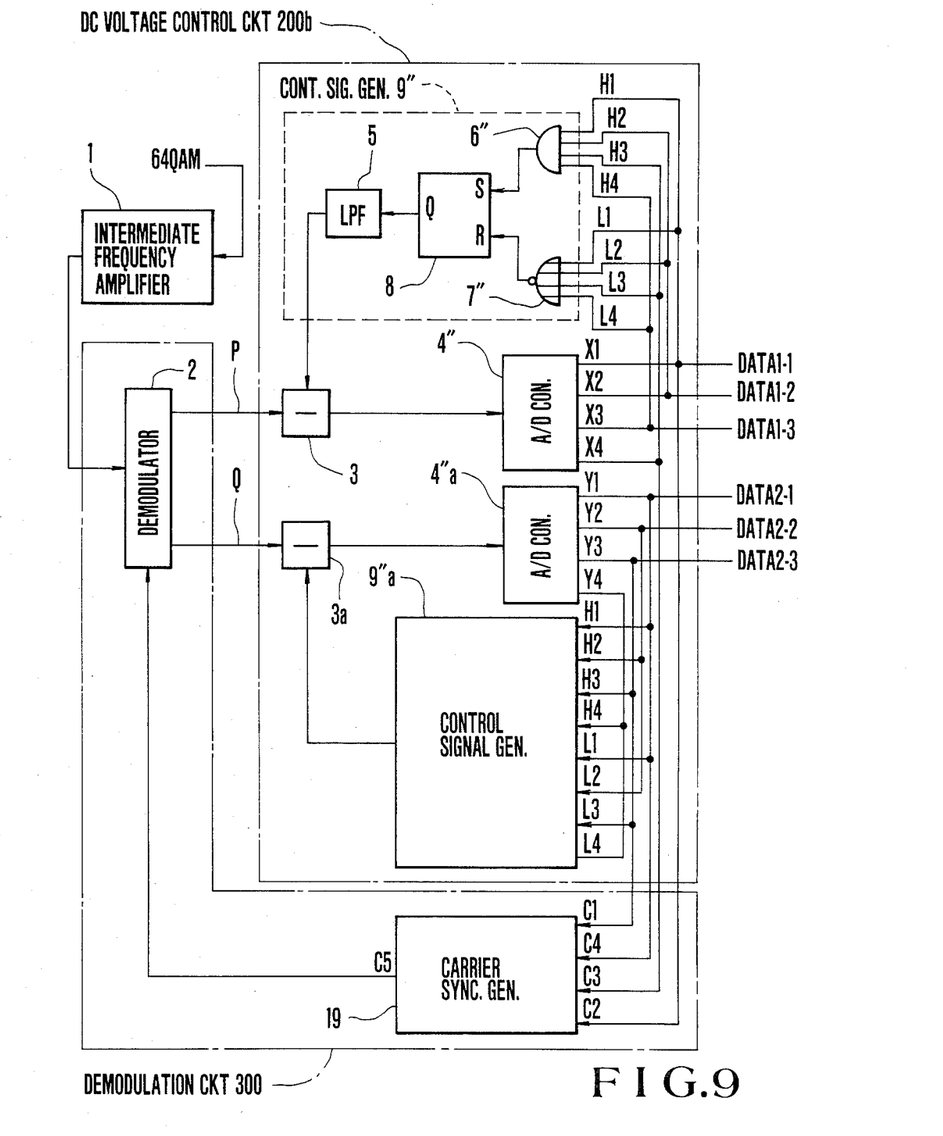
FIG. 9 is a block diagram showing a second embodiment of demodulation apparatus according to this invention which is adapted for demodulation of 64 QAM (64-level quadrature amplitude modulation) waves.

FIG. 9 shows an embodiment of demodulation apparatus of the invention adapted for demodulation of 64 QAM waves, comprising a DC voltage control circuit 200b and the demodulation circuit 300. A control signal generators 9″ and 9a″ have an increased number of input terminals corresponding to an increased number of data signals from A/D converters 4″ and 4a″, which convert the outputs of the subtractors 3 and 3a into the four digital signals, respectively.

What is claimed is:

1. A DC voltage control circuit comprising:
   DC superposing means for superposing a control signal on an input signal;
   discriminating means for discriminating an output of said superposing means with a plurality of discriminating levels including a center level and for providing a regenerated output digital signal and an error digital signal;
   control signal generating means for providing said control signal in response to said error digital signal; and
   limiter means for limiting the output of said discriminating means to be within a predetermined range which is less than a spacing between said discriminating level and said center level.

2. A DC voltage control circuit according to claim 1 wherein said superposing means comprises a subtractor.

3. A DC voltage control circuit according to claim 1 wherein said discriminating means comprises an analog-to-digital converter.

4. A DC voltage control circuit according to claim 1 wherein said control signal generating means comprises a low-pass filter.

5. A DC voltage control circuit comprising:
   DC superposing means for superposing a control signal on an input signal;
   discriminating means for discriminating an output of said superposing means with a plurality of signal discriminating levels including a center discriminating level and with a plurality of error discriminating levels and for providing a plurality of digital signals, said signal discriminating levels dividing said input signal into a plurality of signal regions, said error discriminating levels dividing said signal regions into two, respectively; and
   control signal generator means for generating said control signal in response to some of said digital signals, which comprise error information obtained from said error regions except at least the error regions on positive or negative side adjoining said center discriminating level.

6. A DC voltage control circuit according to claim 5 wherein said control signal generator means responds to error information obtained only from the most remote ones of said error regions from said center discriminating level.

7. A DC voltage control circuit according to claim 5 wherein said control signal generator means responds to all of error information obtained from said error regions except the error regions on positive or negative side adjoining said center discriminating level.

8. A DC voltage control circuit according to claim 5 wherein said control signal generator means responds to error information obtained from alternate ones of said error regions except the error regions on positive or negative side adjoining said center discriminating level.

9. A DC voltage control circuit comprising:

DC superposing means for superposing a control signal on an input signal;

discriminating means for discriminating an output of said superposing means with a plurality of signal discriminating levels including a center discriminating level and with a plurality of error discriminating levels and for providing a plurality of digital signals, said signal discriminating levels dividing said input signal into a plurality of signal regions, said error discriminating levels dividing said signal regions into two, respectively; and control signal generator means for generating said control signal in response to some of said digital signals, which comprise error information selectively obtained from said error regions except at least the error regions on positive or negative side adjoining said center discriminating level, or from all said error regions.

10. A demodulation apparatus comprising in combination a demodulation circuit for demodulating a modulated carrier wave and a DC voltage control circuit for compensating for DC component variations caused when discriminating and regenerating the demodulated signal:

said DC voltage control circuit including a plurality of DC superposing means each superposing a control signal upon an input demodulated signal;

a plurality of discriminating means each connected to the respective DC superposing means, for discriminating an output of said superposing means with a plurality of signal discriminating levels including a center discriminating level and with a plurality of error discriminating levels and for providing a plurality of digital signals, said signal discriminating levels dividing said input signal into a plurality of signal regions, said error discriminating levels dividing said signal regions into two, respectively; and a plurality of control signal generator means for generating said control signal in response to some of said digital signals, which comprise error information obtained from said error regions except at least the error regions on positive or negative side adjoining said center discriminating level;

said demodulation circuit including a carrier synchronizing circuit responsive to the outputs of said DC voltage control circuit for providing a reference carrier wave, and a demodulator for detecting the modulated carrier wave with said reference carrier wave and providing said demodulated signal.

* * * * *

UNITED STATES PATENT AND TRADEMARK OFFICE
CERTIFICATE OF CORRECTION

PATENT NO. : 4,544,894
DATED : October 1, 1985
INVENTOR(S) : Yasuharu YOSHIDA

It is certified that error appears in the above-identified patent and that said Letters Patent is hereby corrected as shown below:

Column 3, line 67, "$A_1$" should read --$A_1'$--;

Column 4, line 50, delete ";" after $\gamma$;

Column 6, line 12, "$B_1$ to $B_4$ and $b_1^1$" should read --$B_1$ to $B_4$ and $B_1'$--

Line 28, "Q1" should read --$Q_1$--;

Signed and Sealed this

Twenty-second Day of April 1986

[SEAL]

Attest:

DONALD J. QUIGG

Attesting Officer     Commissioner of Patents and Trademarks